(12) United States Patent
Feng et al.

(10) Patent No.: US 11,349,933 B1
(45) Date of Patent: May 31, 2022

(54) SYSTEM AND METHOD FOR PROVIDING SERVICES FOR GUEST CONTAINER-BASED CLUSTERS WITHOUT DIRECT ACCESS TO RESOURCE PROVIDER

(71) Applicant: VMware, Inc., Palo Alto, CA (US)

(72) Inventors: Zi Feng, San Carlos, CA (US); Jianjun Shen, Redwood City, CA (US); Fangyuan Li, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 27 days.

(21) Appl. No.: 16/953,269

(22) Filed: Nov. 19, 2020

(51) Int. Cl.
*H04L 67/141* (2022.01)
*H04L 67/00* (2022.01)
*G06F 9/451* (2018.01)
*G06F 9/455* (2018.01)
*H04L 67/02* (2022.01)

(52) U.S. Cl.
CPC ........... *H04L 67/141* (2013.01); *G06F 9/452* (2018.02); *G06F 9/45545* (2013.01); *H04L 67/02* (2013.01); *H04L 67/34* (2013.01)

(58) Field of Classification Search
CPC ....... H04L 67/141; H04L 67/02; H04L 67/34; G06F 9/452; G06F 9/45545
See application file for complete search history.

(56) References Cited

U.S. PATENT DOCUMENTS

| | | | | |
|---|---|---|---|---|
| 9,678,773 | B1* | 6/2017 | Wagner | G06F 9/45533 |
| 2020/0167180 | A1* | 5/2020 | Tsirkin | G06F 9/45558 |
| 2020/0192678 | A1* | 6/2020 | Tsirkin | G06F 9/445 |
| 2021/0311762 | A1* | 10/2021 | Shepherd | G06F 9/45558 |
| 2021/0311763 | A1* | 10/2021 | Beard | G06F 8/65 |
| 2021/0311764 | A1* | 10/2021 | Rosoff | G06F 9/4881 |
| 2021/0311792 | A1* | 10/2021 | Rosoff | G06F 9/5027 |
| 2021/0382741 | A1* | 12/2021 | Dontu | G06F 9/45558 |

* cited by examiner

*Primary Examiner* — Philip J Chea
*Assistant Examiner* — Wuji Chen
(74) *Attorney, Agent, or Firm* — Loza & Loza, LLP (57) ABSTRACT

A computing system and method for providing a service for a guest container-based cluster of the computing system utilizes a translated service software object created in a supervisor container-based cluster of the computing system to create at least one resource to support the service requested for the guest container-based cluster. The translated service software object is created in response to a service software object being created in the guest container-based cluster. In response to the translated service software object being created in the supervisor container-based cluster, at least one service-related software object is then created in the supervisor container-based cluster that corresponds to the translated service software object. Provider-specific instructions are then sent to a resource provider from the supervisor container-based cluster to create at least one resource associated with the at least one service-related software object to support the requested service for the guest container-based cluster.

20 Claims, 6 Drawing Sheets

SYSTEM AND METHOD FOR PROVIDING SERVICES FOR GUEST CONTAINER-BASED CLUSTERS WITHOUT DIRECT ACCESS TO RESOURCE PROVIDER

BACKGROUND

Kubernetes® software is an open-source container orchestration software that automates the operation of containerized cloud applications. Kubernetes software can support data center outsourcing to public cloud service providers or can be used for web hosting at scale. Server and mobile applications with complex custom code can be deployed using Kubernetes software on commodity hardware to lower the costs on application provisioning with public cloud hosts and to optimize software development processes. Thus, Kubernetes software is rapidly emerging as a mainstream platform for container orchestration in both on-premise and cloud environments.

As increasing amount of workloads are being deployed with Kubernetes software, there are concerns that some communications within a Kubernetes environment may be exposed security risks. Thus, there is a need to minimize security risks in Kubernetes environments.

SUMMARY

A computing system and method for providing a service for a guest container-based cluster of the computing system utilizes a translated service software object created in a supervisor container-based cluster of the computing system to create at least one resource to support the service requested for the guest container-based cluster. The translated service software object is created in response to a service software object being created in the guest container-based cluster. In response to the translated service software object being created in the supervisor container-based cluster, at least one service-related software object is then created in the supervisor container-based cluster that corresponds to the translated service software object. Provider-specific instructions are then sent to a resource provider from the supervisor container-based cluster to create at least one resource associated with the at least one service-related software object to support the requested service for the guest container-based cluster.

A computer-implemented method for providing a service for a guest container-based cluster in a computing system in accordance with an embodiment of the invention comprises receiving a request for the service at the guest container-based cluster; in response to the request, creating a service software object corresponding to the service in the guest container-based cluster; in response to the service software object being created in the guest container-based cluster, creating a translated service software object in a supervisor container-based cluster of the computing system; in response to the translated service software object being created in the supervisor container-based cluster, creating at least one service-related software object in the supervisor container-based cluster that corresponds to the translated service software object; and in response to the at least one service-related software object being created in the supervisor container-based cluster, sending provider-specific instructions to a resource provider from the supervisor container-based cluster to create at least one resource associated with the at least one service-related software object to support the requested service for the guest container-based cluster. In some embodiments, the steps of this method are performed when program instructions contained in a non-transitory computer-readable storage medium are executed by one or more processors.

A computing system in accordance with an embodiment of the invention comprises memory and at least one processor configured to receive a request for a service at a guest container-based cluster of the computing system; in response to the request, create a service software object corresponding to the service in the guest container-based cluster; in response to the service software object being created in the guest container-based cluster, create a translated service software object in a supervisor container-based cluster of the computing system; in response to the translated service software object being created in the supervisor container-based cluster, create at least one service-related software object in the supervisor container-based cluster that corresponds to the translated service software object; and in response to the at least one service-related software object being created in the supervisor container-based cluster, send provider-specific instructions to a resource provider from the supervisor container-based cluster to create at least one resource associated with the at least one service-related software object to support the requested service for the guest container-based cluster.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
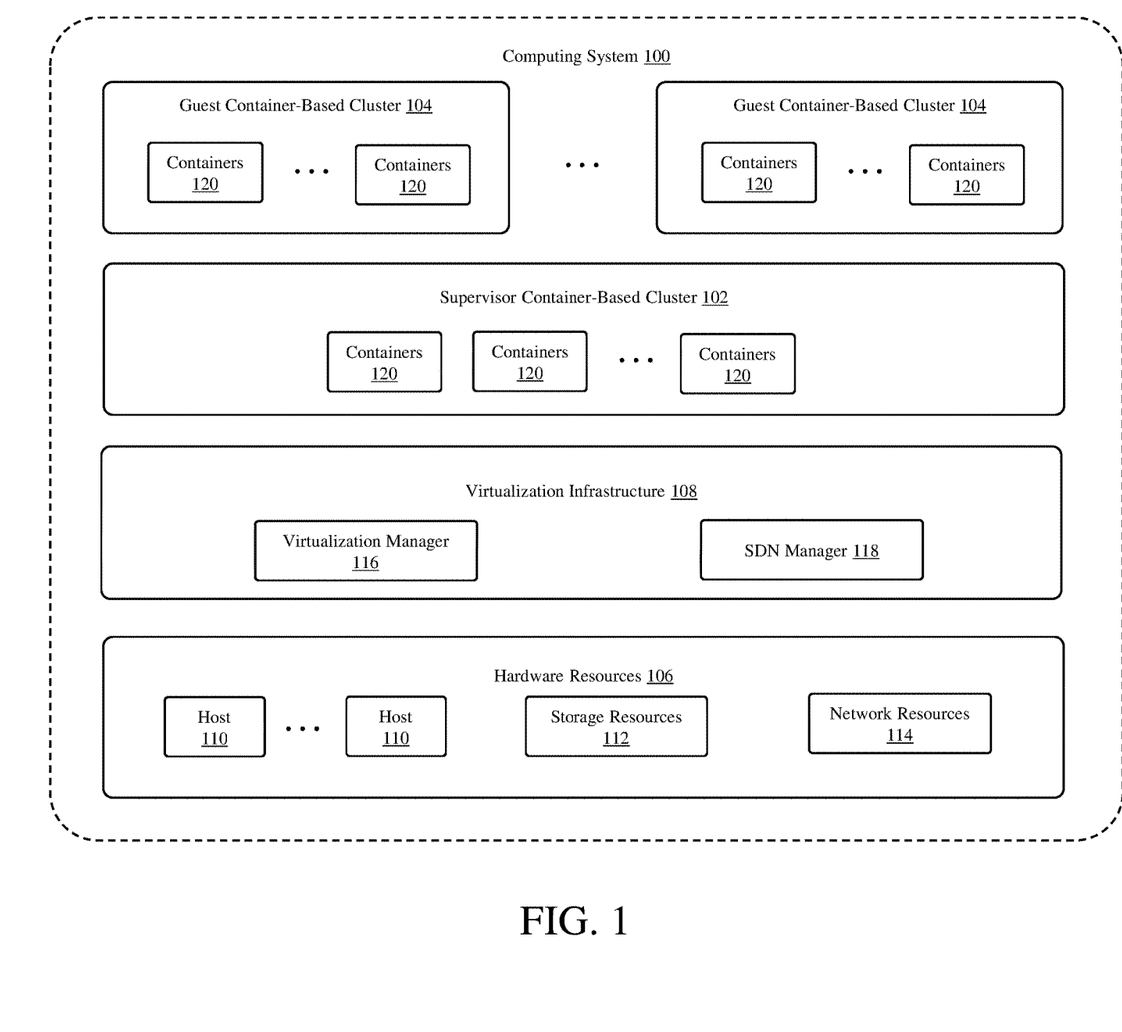
FIG. 1 is a block diagram of a computing system in accordance with an embodiment of the invention.

Turning now to FIG. 1, a computing system 100 in accordance with an embodiment of the invention is illustrated. As shown in FIG. 1, the computing system 100 includes a supervisor container-based cluster 102 and a number of guest container-based clusters 104, which are supported by hardware resources 106 and a virtualization infrastructure 108. The supervisor and guest container-based clusters 102 and 104 are computing environments that offer compute, storage and network as resources for hosting or deployment of services or applications. In an embodiment, the supervisor and guest container-based clusters 102 and 104 may be Kubernetes® clusters. However, in other embodiments, the supervisor and guest container-based clusters 102 and 104 may be another type of container-based cluster based on container technology, such as Docker® clusters. As explained below, the computing system 100 uses a technique to avoid a requirement for the guest container-based clusters 104 to directly access the virtualization infrastructure 108 when services that need external resources are requested for the guest container-based clusters to reduce security exposure of the virtualization infrastructure, which is part of the management network of the computing system.

The hardware resources 106 of the computing system 100 include host computers (hosts) 110, physical storage resources 112 and physical network resources 114. These hardware resources may be provided by a cloud provider if the supervisor and guest container-based clusters 102 and 104 are deployed in a public cloud. Alternatively, these hardware resources may be part of an on-premises data center. Each of the hosts includes hardware components commonly found on a server grade computer, such as CPU, memory, network interface card and one or more storage devices. In addition, each host includes a virtualization layer that abstracts processor, memory, storage, and networking resources of the host's hardware into virtual machines that run concurrently on the host. In an embodiment, the virtual machines run on top of a hypervisor that enables sharing of the hardware resources of the host by the virtual machines. One example of a hypervisor may be used in the hosts is a VMware ESXi™ hypervisor provided as part of the VMware vSphere® solution made commercially available from VMware, Inc. The hypervisor of each host may run on top of the operating system of the host or directly on hardware components of the host.

The physical storage resources 112 may include the storage devices of the hosts 110 and/or other storage devices, which may be part of a storage system, such as a physical or virtual storage area network (SAN) or a network-attached storage (NAS).

The physical network resources 114 may include physical switches, physical routers and/or physical gateways. The physical switches provide connectivity between various components in the computing system 100. The physical routers perform packet forwarding functions to ensure data are transmitted to their intended destinations. The physical gateways serve as junctions between the computing system 100 and other networks, such as other data centers and the Internet.

The virtualization infrastructure 108 of the computing system 100 provides virtualization to provision virtual compute, storage and network resources for the supervisor and guest container-based clusters 102 and 104 from the hardware resources 106. In the illustrated embodiment, the virtualization infrastructure includes a virtualization manager and a software-defined network (SDN) manager. However, in other embodiments, the virtualization infrastructure may include other components that support the supervisor and guest container-based clusters.

The virtualization manager 116 is configured to carry out administrative tasks for the computing system 100, including managing the hosts 110, managing various virtual computing instances (VCIs), such as virtual machines and containers running on the hosts, provisioning new VCIs, migrating VCIs from one host to another host, and load balancing between the hosts. One example of the virtualization manager 116 is the VMware vCenter Server® product that is available from VMware, Inc.

The SDN manager 118 is configured to provide a graphical user interface (GUI) and REpresentational State Transfer (REST) application programming interfaces (APIs) for creating, configuring, and monitoring SDN components and resources, such as logical switches, edge services gateways, load balancers, virtual servers, server pools and pool members. Thus, the SDN manager can be viewed as a resource provider that can provide various resources for different components of the computing system 100, such as the supervisor and guest container-based clusters 102 and 104. The SDN manager allows configuration and orchestration of logical network components for logical switching and routing, networking and edge services, load balancing, and security services and distributed firewall (DFW). In some embodiments, the SDN manager is further configured to provide these functionalities in a public cloud computing environment. One example of the SDN manager is the NSX® manager of VMware NSX-T product that is available from VMware, Inc.

The virtualization manager 116 and the SDN manager 118 provide support for the supervisor container-based cluster 102 to be created and execute supervisory functionalities, as explained below. The supervisor container-based cluster includes multiple containers 120 that run various software processes or applications. A container is a package that relies on virtual isolation to deploy and run applications that access a shared operating system (OS) kernel. An example of a container is the container created using a Docker engine made available by Docker, Inc.

The supervisor container-based cluster 102 is configured to create and manage one or more guest container-based clusters 104, which also includes containers 120, using compute, network and storage resources available to the supervisor container-based cluster. Since guest container-based clusters are created by the supervisor container-based clusters, each of the guest container-based clusters can be viewed as a child container-based cluster and the supervisor container-based cluster can be viewed as the parent container-based cluster of that guest container-based cluster.

In some embodiments, the supervisor and guest container-based clusters 102 and 104 are Kubernetes® clusters that are deployed using containers running on virtual machines, which are hosted in a logical cluster of the host computers 110. As used herein, a virtual machine is an emulation of a physical computer system in the form of a software computer that, like a physical computer, can run an operating system and applications, including containers. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, Calif. A host computer 200 with containers running in one or more virtual machines in accordance with an embodiment of the invention, which is representative of the host computers 110 in the computing system 100 is illustrated in FIG. 2.

Figure 2:
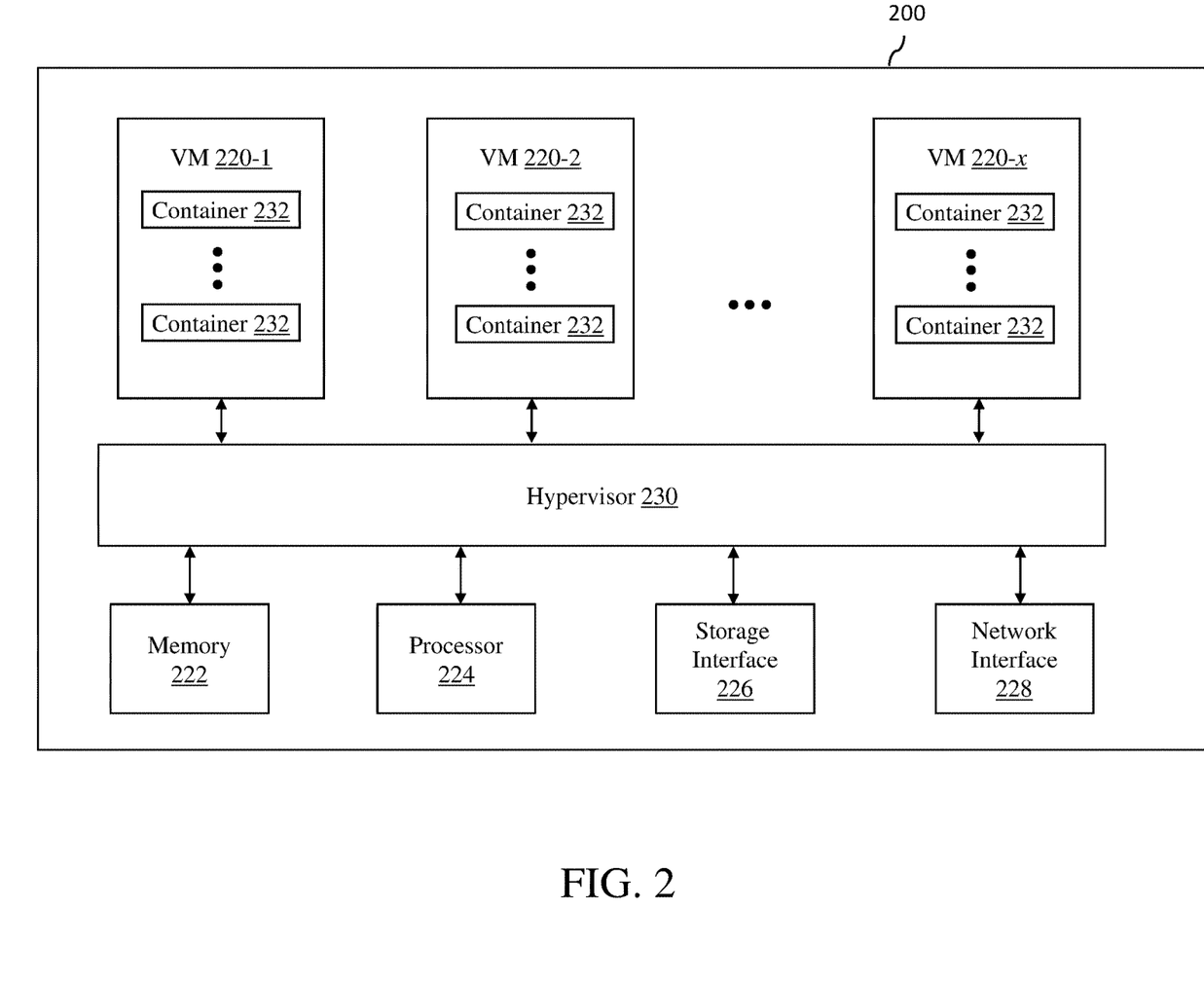
FIG. 2 is a block diagram of a host computer with containers running in one or more virtual machines in accordance with an embodiment of the invention, which is representative of the host computers in the computing system.

As shown in FIG. 2, the host computer is configured to support a number of virtual machines (VMs) 220-1, 220-2 . . . 220-x (where x is a positive integer). The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with a storage (not shown). As an example, the storage interface may be a host bus adapter or a network file system interface. The network interface 228 is an interface that allows the host computer to communicate with other devices and systems through one or more networks. As an example, the network interface may be a network interface controller (NIC).

In the illustrated embodiment, the VMs 220-1, 220-2 . . . 220-x run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for one or more containers.

The VMs 220-1, 220-2 . . . 220-x, as well as containers 232 running in the VMs, are able to communicate with each other using an internal software OSI Layer 2 switch (not shown) and with other computer systems or components connected to the host computer via a network using the network interface 228 of the host computer 200. In addition, the VMs, as well as the containers running in the VMs, are able to access storage using the storage interface 226 of the host computer.

Figure 3:
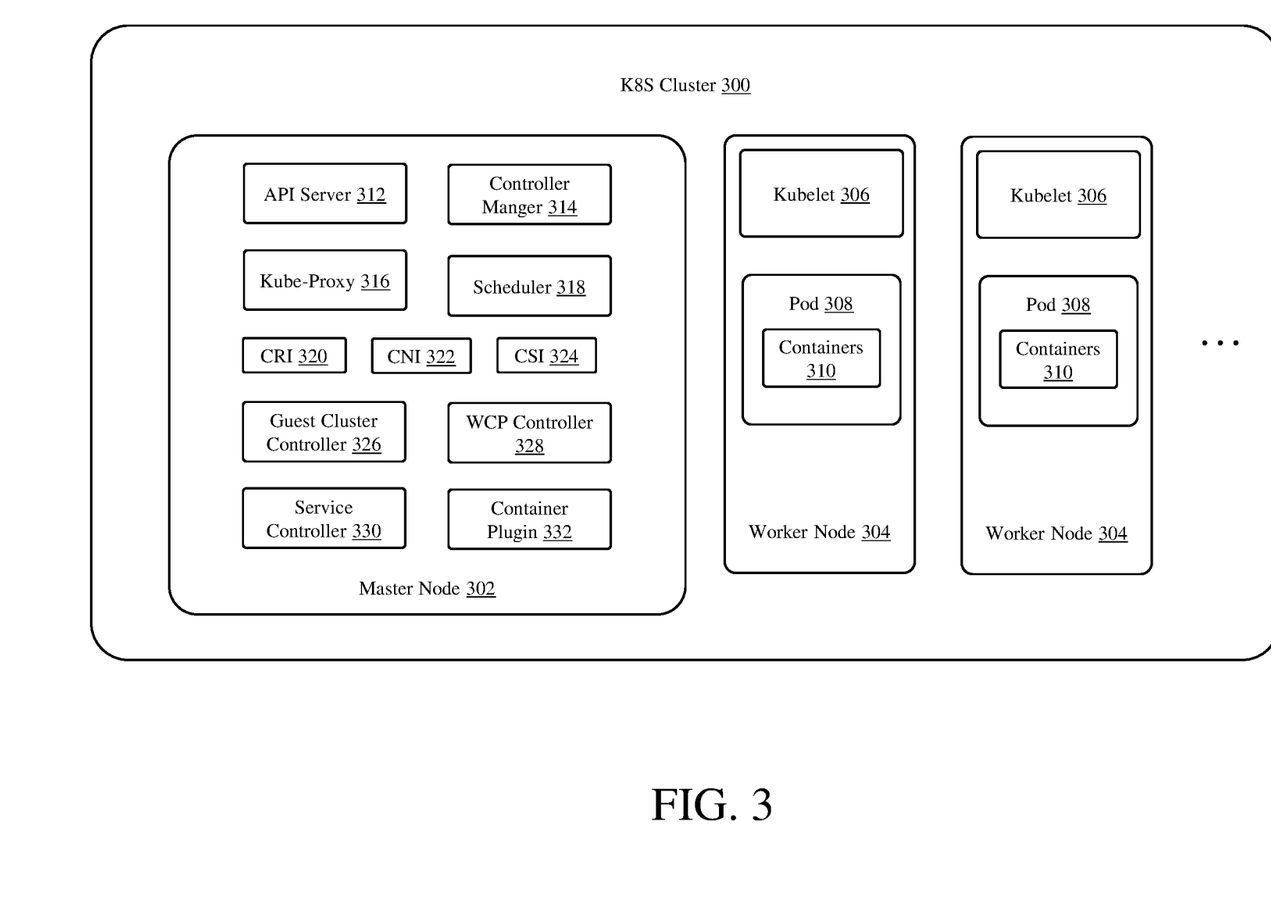
FIG. 3 is a block diagram of an exemplary Kubernetes® (K8S®)) cluster in accordance with an embodiment of the invention, which can be deployed as a supervisor or guest container-based cluster of the computing system.

Turning now to FIG. 3, an exemplary Kubernetes® (K8S®) cluster 300 in accordance with an embodiment of the invention, which can be deployed as the supervisor container-based cluster 102 or one of the guest container-based clusters 104 of the computing system 100, is illustrated. As shown in FIG. 3, the K8S cluster 300 includes a master node 302 and a number of worker nodes 304. Each worker node 304, or worker compute machine, includes a kublet 306 that runs one or more pods 308 in the worker node. Each pod 308 may include one or more containers 310. The worker nodes can be used to execute various applications and software processes using the containers. The master node 302 includes an API server 312 and a controller manager 314. The API server 312 operates as a gateway to the K8S cluster 300, which can be accessed by users, automation and components in the K8S cluster. The controller manager 314 operates to monitor the API server 312, and execute various operations in response to certain events. If the K8S cluster 300 is a guest container-based cluster, the controller manager 314 may execute certain operations when services are requested for the cluster, as described below.

The master node 302 may include other components, such as a kube-proxy 316, a scheduler 318, a container runtime interface (CRI) 320, a container network interface (CNI) 322 and a container storage interface (CSI) 324, which are well-known components of a K8S cluster. The kube-proxy 316 is a Kubernetes network proxy that proxies User Datagram Protocol (UDP), Transmission Control Protocol (TCP) and Stream Control Transmission Protocol (SCTP), provides load balancing and can be used to reach services. There may be kube-proxy in each of the worker nodes. The scheduler 318 operates to make sure that the pods are matched to the nodes in the K8S cluster 300 so that the kublets 306 can run them. The CRI 320, CNI 322 and CSI 324 provide compute, network and storage resources for the containers 310 in the K8S cluster.

If the K8S cluster 300 is a supervisor container-based cluster, the K8S cluster has additional components, which include at least a guest cluster controller 326, a workload control plane (WCP) controller 328, a service controller 330 and a container plugin 332, as shown in FIG. 3. These components enable the K8S cluster 300 to execute various operations as the supervisor container-based cluster to create and manage one or more guest container-based clusters 104, and to enable various capabilities for the guest container-based clusters.

The guest cluster controller 326 operates to manage the lifecycle of guest container-based clusters created by the K8S cluster 300 as the supervisor container-based cluster. Thus, the guest cluster controller can create, manage and delete guest container-based clusters. In an embodiment, the guest cluster controller may be a Tanzu Kubernetes cluster controller provided by a vSphere® with Kubernetes product, which is available from VMware, Inc.

The workload control plane controller 328 operates to enable various capabilities for the guest container-based clusters created through the K8S cluster 300 as the supervisor container-based cluster. In particular, the workload control plane controller can create translated service software objects, for example, virtual machine service software objects, to enable capabilities for the guest container-based clusters. A virtual machine service software object is a K8s Custom Resource created in the supervisor cluster K8s API to represent an LB Service that is backed by a pool of VM endpoints. In the computing system 100, one VM service is created for each k8s "Service of loadbalancer type" of the guest cluster, with the endpoints to be all VMs (i.e., VM IP addresses) in the guest cluster with node port (NodePort) number allocated for the guest cluster service. In an embodiment, the guest cluster controller may be a Cluster API for Workload Control Plane (CAPW) controller provided by a vSphere with Kubernetes product, which is available from VMware, Inc.

The service controller 330 operates to monitor the service-related software objects, for example, virtual machine service software objects, created by the workload control plane controller 328 and uses the specifications defined in the virtual machine service software objects to create and configure various VMs. In particular, the service controller may create various software objects for services that correspond to the virtual machine service software objects created by the workload control plane controller. As an example, with respect to a virtual machine service software objects for a load balancer service, the service controller may create (1) a load balancer object, (2) a load balancer type service object and (3) one or more endpoints, which includes parameters and definitions of resources that are needed to created. In an embodiment, the service controller may be a virtual machine operator (VMOP) provided by a vSphere with Kubernetes product, which is available from VMware, Inc.

The container plugin 332 is a controller that watches for certain software objects created in the K8S cluster 300 functioning as the supervisor container-based cluster and orchestrates the creation of corresponding resources by an external resource provider, which may be the SDN manager 118 in the computing system 100. The corresponding resources are dependent on the resource provider. Thus, the container plugin is designed or programmed to send provider-specific instructions to a particular resource provider that can create the needed resources. In order to send the correct provider-specific instructions for the software objects created in the supervisor container-based cluster, the container plugin maps each of the software objects to one or more provider-specific resources that need to be created by the resource provider. Once the provider-specific resources are determined, appropriate instructions can be sent to the resource provider so that the provider-specific resources can be created by resource provider. As an example, with respect to software objects related to a load balancer service, the container plugin will send provider-specific instructions to create (1) load balancer (e.g., NSX-T load balancer) and T1 gateway (e.g., NSX-T T1 gateway) that are mapped to a load balancer object, (2) a virtual server (e.g., NSX-T virtual server) and a server pool (e.g., NSX-T server pool) that are mapped to a load balancer type service object and (3) static pool members that are mapped one or more endpoints. In an embodiment, the container plugin may be a NSX container plugin (NCP) provided by a vSphere with Kubernetes product, which is available from VMware, Inc. Thus, in this embodiment, the container plugin is designed or programmed to interface with an NSX manager. However, in other embodiments, the container plugin is designed or programmed to interface with another resource provider, such as Avi Network or HAProxy.

When a service, such as a load balancer service, that requires the creation of one or more external resources, such as an external load balancer and other network resources, is requested for a guest container-based cluster, there needs to be a communication mechanism between the guest container-based cluster and the resource provider, such as the SDN manager 118 of the virtual infrastructure 108. However, if the communication mechanism provides a direct access from the guest container-based cluster to the resource provider, this introduces a security vulnerability to the computing system 100. This is due to the fact that the network of the guest container-based clusters is less secure than the management network of the virtual infrastructure to which the virtualization manager and the SDN manager are connected. Thus, rather than a direct access to the virtual infrastructure, the computing system uses an indirect access mechanism to the virtual infrastructure through the supervisor container-based cluster when resources are required in response to requested services for the guest container-based clusters, as explained below.

Figure 4:
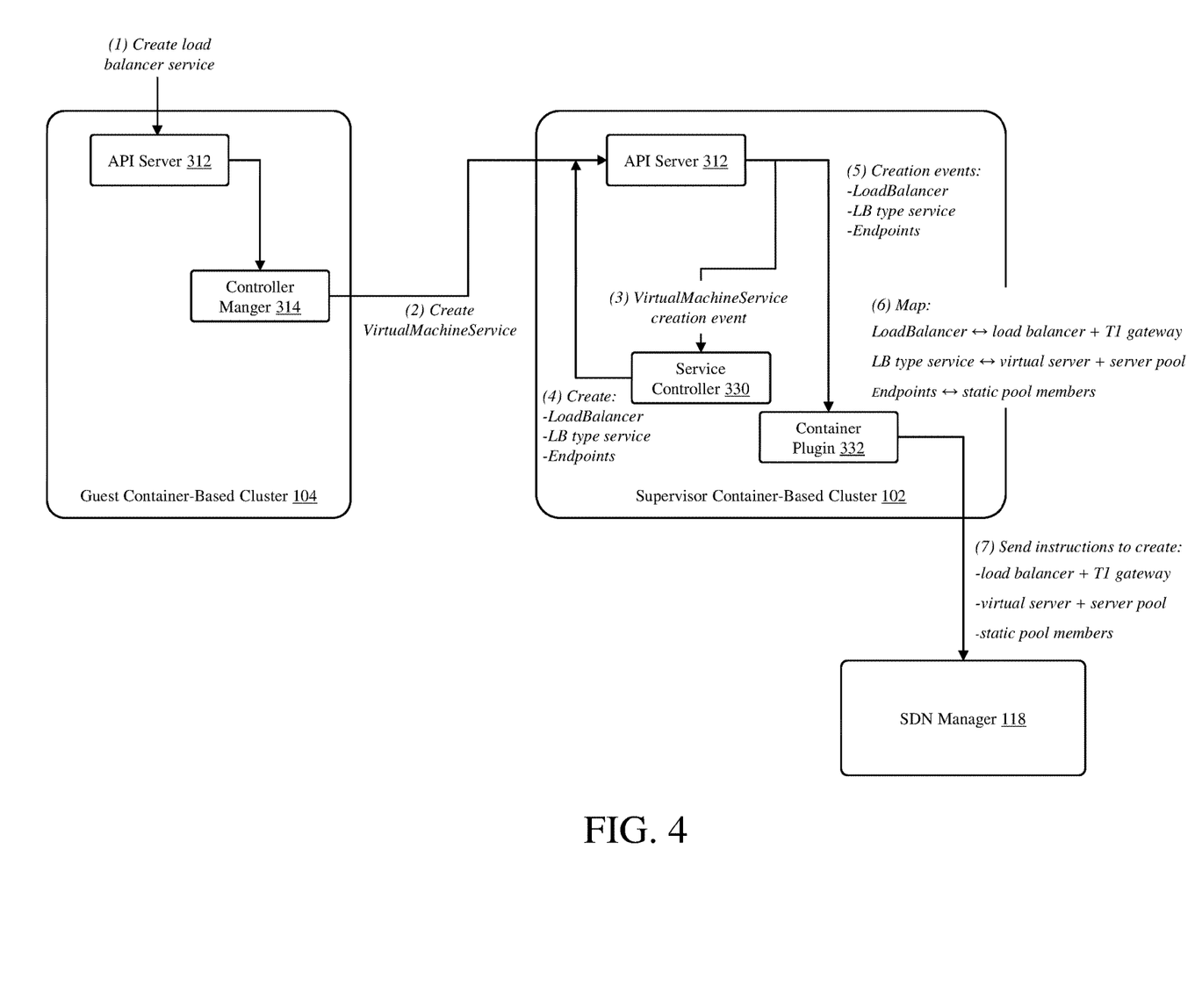
FIG. 4 is a block diagram of components of the computing system to illustrate a process of providing service, which needs one or more external resources to be created by a resource provider, for a guest container-based cluster without direct access to the resource provider by the guest container-based cluster.

Turning now to FIG. 4, components of the computing system 100 are shown to illustrate the process of providing service, which needs one or more external resources to be created by a resource provider, e.g., the SDN manager 118, for a guest container-based cluster without direct access to the resource provider by the guest container-based cluster. In FIG. 4, only one of the guest container-based clusters 104, the supervisor container-based cluster 102 and the SDN manager 118 of the computing system 100 are shown. In order to not obscure the inventive features of the computing system, the supervisor container-based cluster 102 is illustrated with only the API server 312, the service controller 330 and the container plugin 332, while the guest container-based cluster 104 is illustrated with only the API server 312 and the controller manager 314.

When a user, such as a developer, wants to create a service that requires one or more external resources for the guest container-based cluster 104, a software object for the service is created in the guest container-based cluster via the API server 312 of the guest container-based cluster in response to a request for the service made by the user. As an example, if the user wants to create a load balancer type service for the guest container-based cluster, a load balancer type service software object is created in the guest container-based cluster via the API server of the guest container-based cluster.

The creation of the software object for the service is detected by the controller manager 314 of the guest container-based cluster 104, which monitors the API server 312 of the guest container-based cluster for certain events in the guest container-based cluster, such as the creation of software objects in the guest container-based cluster. When the creation of the software object for the service is detected, a translated service object is created in the supervisor container-based cluster 102 by the controller manager 314 of the guest container-based cluster 104 via the API server 312 of the supervisor container-based cluster 102. In a particular embodiment, the translated service object is a virtual machine service object for the requested service that corresponds to the software object for the service created in the guest container-based cluster.

The creation of the translated service object in the supervisor container-based cluster 102 is then detected by the service controller 330 in the supervisor container-based cluster 102, which monitors the API server 312 of the supervisor container-based cluster 102 for the certain events in the supervisor container-based cluster, such as the creation of particular service software objects in the supervisor container-based cluster. When the creation of the translated service software object is detected, one or more service-related software objects that corresponds to the translated service software object are created in the supervisor container-based cluster by the service controller 330. In an embodiment, the service-related software objects that are created include (1) a load balancer object, (2) a load balancer type service object and (3) one or more endpoints.

The creation of the service-related software objects in the supervisor container-based cluster 102 is then detected by the container plugin 332, which monitors the API server 312 of the supervisor container-based cluster for the certain events in the supervisor container-based cluster, such as the creation of service-related software objects in the supervisor container-based cluster. When the creation of the service-related software objects is detected, the service-related software objects are mapped to provider-specific resources that are needed for the requested service by the container plugin. In an embodiment, (1) the load balancer object is mapped to a load balancer (e.g., NSX-T load balancer) and a T1 gateway (e.g., NSX-T T1 gateway), (2) the load balancer type service object is mapped to a virtual server (e.g., NSX-T virtual server) and a server pool (e.g., NSX-T server pool), and (3) the endpoints are mapped to static pool members. After the resources have been determined by the container plugin, provider-specific instructions are sent to the SDN manager 118, which is the resource provider in the illustrated embodiment, to create the provider-specific resources that are needed for the requested service. All the necessary configurations for the guest container-based cluster to enable the request service using the resources created by the resource provider are taken care by the supervisor container-based cluster.

In this fashion, there is no direct access to the SDN manager 118 by the guest container-based cluster 104 to create the resources needed for the request service for the guest container-based cluster. Rather, the supervisor container-based cluster 102 is used to translate the requested service for the container-based cluster and access the SDN manager 118. Thus, the supervisor container-based cluster functions as an intermediary mechanism between the guest container-based cluster and the SDN manager when services are quested for the guest container-based cluster, which significantly reduces security vulnerability of the management network. This process of providing service for guest container-based clusters using the supervisor container-based cluster is further explained below by describing the operation of the computing system 100 for such a process.

Figure 5:
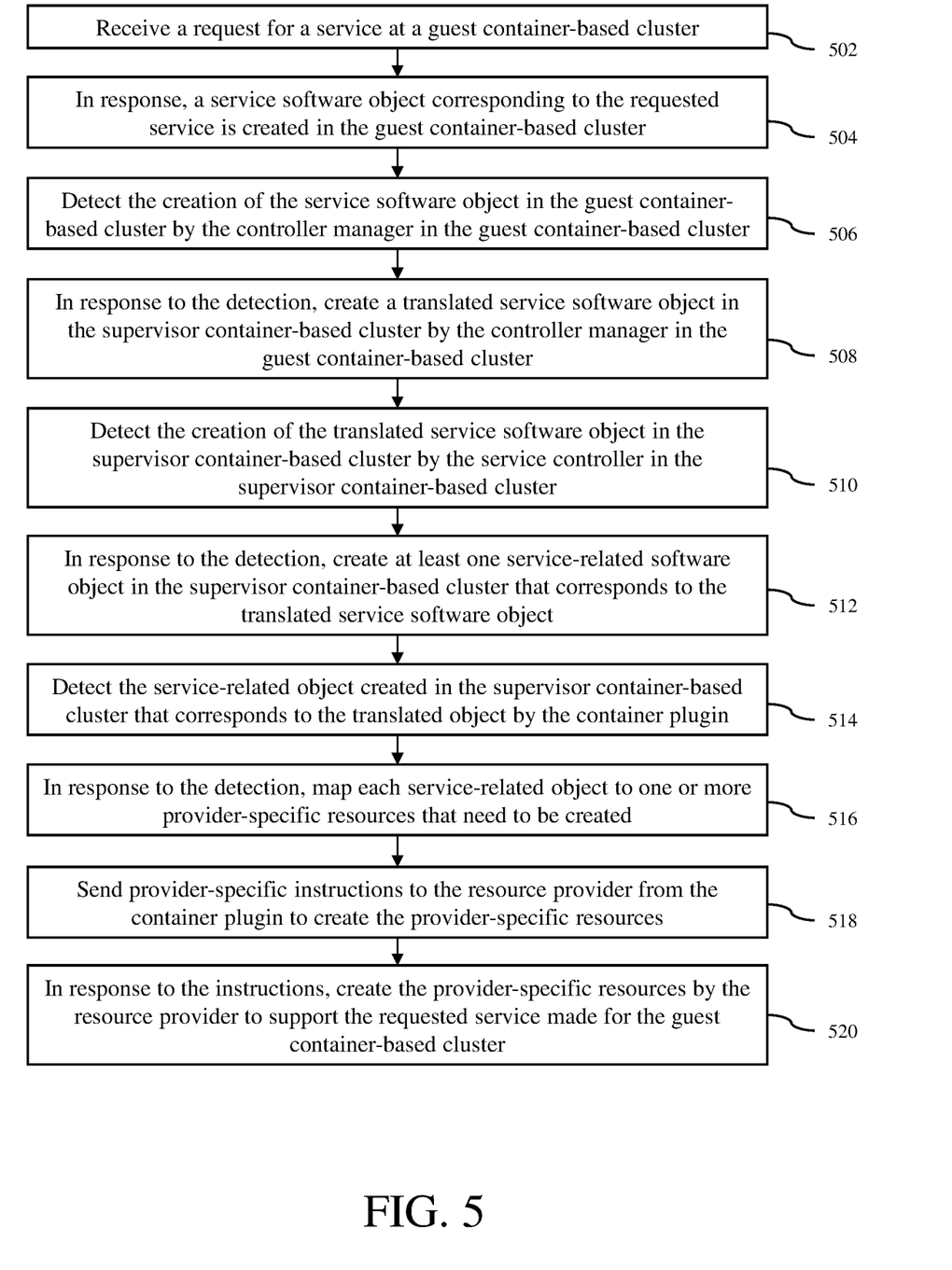
FIG. 5 is a process flow diagram of an operation of the computing system for providing a service for a guest container-based cluster of the computing system in accordance with an embodiment of the invention.

An operation of the computing system 100 for providing a service for a guest container-based cluster 104 of the computing system in accordance with an embodiment of the invention is described with reference to a process flow diagram of FIG. 5. The service for the guest container-based cluster is any service for a container-based cluster that requires one or more external resources to be created by a resource provider, such as the SDN manager 118 of the virtualization infrastructure 108 in the computing system. In this description, the service being requested is a load balancer and the guest container-based cluster is a Kubernetes cluster. However, the service being requested can be any service for a container-based cluster and the guest container-based cluster can be any type of a container-based cluster, such as a Docker cluster.

The operation begins at step 502, where a request for a load balancer service is received at the guest container-based cluster 104. In an embodiment, the request is received by the API server 312 in the guest container-based cluster from a user interface, where a user can make the service request. In one implementation, the request may be made by setting the service type to "load balancer" in a service configuration file for the guest container-based cluster.

Next, at step 504, in response to the received service request, a service software object corresponding to the requested service is created by the API server 312 in the guest container-based cluster 104. In the embodiment in which the guest container-based cluster 104 is a Kubernetes cluster, the service software object created is a REST object that targets a set of pods in the guest container-based cluster.

Next, at step 506, the creation of the service software object in the guest container-based cluster 104 is detected by the controller manager 314 in the guest container-based cluster. In an embodiment, the event of creating the service software object is notified to the controller manager 314 by the API server 312 in the guest container-based cluster.

Next, at step 508, in response to the detection of the service software object being created in the guest container-based cluster 104, a translated service software object corresponding to the service software object created in the guest container-based cluster is created in the supervisor container-based cluster 102 by the controller manager 314 in the guest container-based cluster 104 via the API server 312 in the supervisor container-based cluster 102. The translated service software object created in the supervisor container-based cluster is a representation of the service software object created in the guest container-based cluster. Thus, it can be viewed that the service software object created in the guest container-based cluster is translated into a different service software object created in the supervisor container-based cluster. In an embodiment, the translated service software object created in the supervisor container-based cluster is a virtual machine service object.

Next, at step 510, the creation of the translated service software object in the supervisor container-based cluster 102 is detected by the service controller 330 in the supervisor container-based cluster. In an embodiment, the event of creating the translated service software object is notified to the service controller 330 by the API server 312 in the supervisor container-based cluster. In this embodiment, the service controller may be subscribed with the API server 312 in the supervisor container-based cluster to receive certain type of events, such as creation of virtual machine services.

Next, at step 512, in response to the detection of the translated service software object being created in the supervisor container-based cluster 102, at least one service-related software object is created in the supervisor container-based cluster that corresponds to the translated service software object created in the supervisor container-based cluster by the service controller 330 in the supervisor container-based cluster. In an embodiment for a load balancer virtual machine service, three service-related software objects are created by the service controller 330. The three provider-specific software objects are (1) a load balancer software object, (2) a load balancer type service and (3) endpoints.

Next, at step 514, the creation of the service-related software objects in the supervisor container-based cluster 102 is detected by the container plugin 332 in the supervisor container-based cluster. In an embodiment, the API server 312 in the supervisor container-based cluster is continuously monitored by the container plugin to detect certain type of events, such as creation events of service-related software objects in the supervisor container-based cluster.

Next, at step 516, in response to the detection of the service-related software objects being created in the supervisor container-based cluster 102, each service-related software object is mapped to one or more provider-specific resources that need to be created by the resource provider, e.g., the SDN manager 118, for that service-related software object. In an embodiment, the following mapping is used by the container plugin 332 to map the service-related software objects to corresponding provider-specific resources:

(1) a load balancer software object↔a load balancer (e.g., an NSX-T load balancer) and a T1 gateway (e.g., an NSX-T T1 gateway)
(2) a load balancer type service↔a virtual server (e.g., an NSX-T virtual server) and a server pool (e.g., an NSX-T server pool)
(3) endpoints↔static pool members Next, at step 518, provider-specific instructions are sent from the container plugin 332 in the supervisor container-based cluster 102 to the resource provider, e.g., to create the mapped resources. In an embodiment, the instructions are sent to the SDN manager of the virtual infrastructure.

Next, at step 520, in response to the instructions, the resources are created by the resource provider, e.g., the SDN manager 118, to support the requested service made for the guest container-based cluster. In the embodiment in which the three types of provider-specific software objects (a load balancer software object, a load balancer type service and endpoints) are created in the supervisor container-based cluster, the following resources are created by the resource provider, e.g., the SDN manager 118: a load balancer (e.g., an NSX-T load balancer), a T1 gateway (e.g., an NSX-T T1 gateway), a virtual server (e.g., an NSX-T virtual server), a server pool (e.g., an NSX-T server pool) and static pool members.

Figure 6:
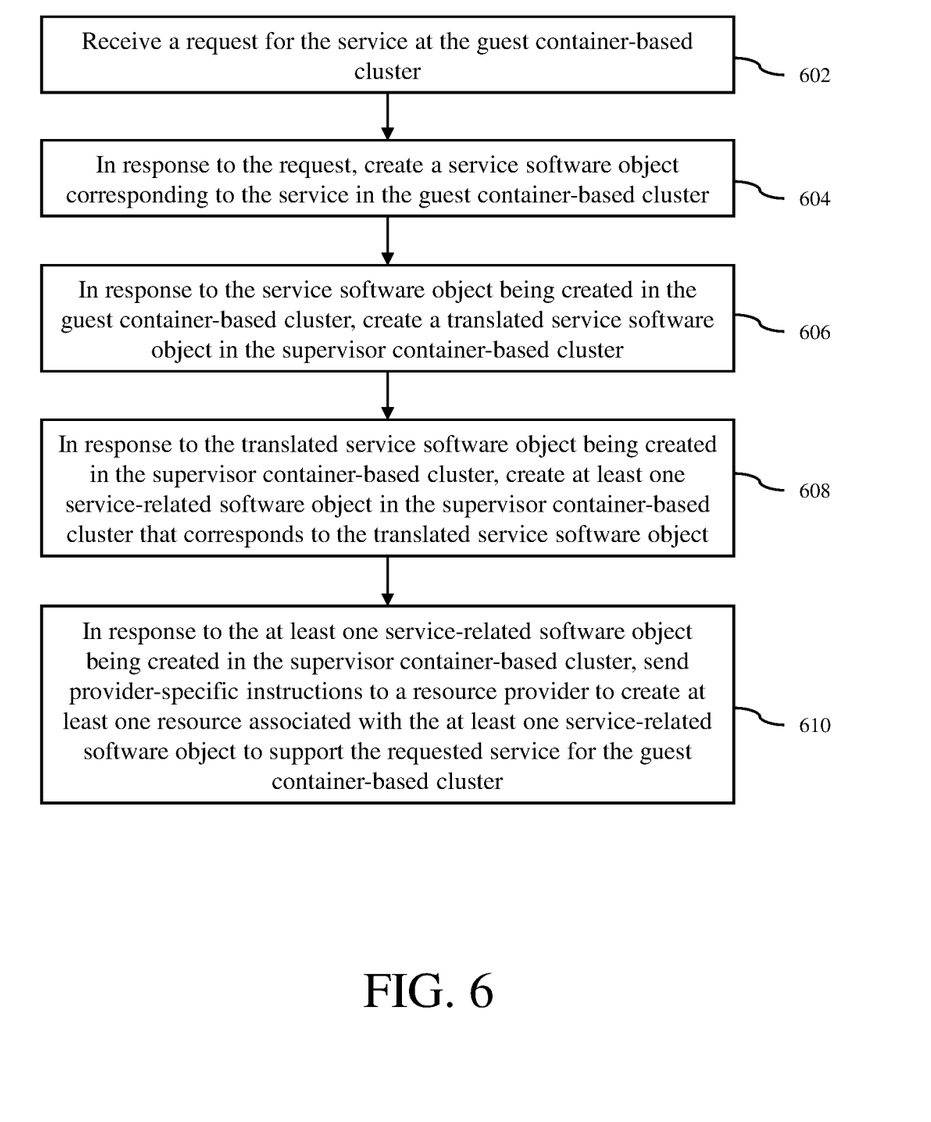
FIG. 6 is a process flow diagram of a computer-implemented method for providing a service for a guest container-based cluster in a computing system in accordance with an embodiment of the invention.

A computer-implemented method for providing a service for a guest container-based cluster in a computing system in accordance with an embodiment of the invention is described with reference to a flow diagram of FIG. 6. At block 602, a request for the service is received at the guest container-based cluster. At block 604, in response to the request, a service software object corresponding to the service is created in the guest container-based cluster. At block 606, in response to the service software object being created in the guest container-based cluster, a translated service software object is created in a supervisor container-based cluster of the computing system. At block 608, in response to the translated service software object being created in the supervisor container-based cluster, at least one service-related software object is created in the supervisor container-based cluster that corresponds to the translated service software object. At block 610, in response to the at least one service-related software object being created in the supervisor container-based cluster, provider-specific instructions are sent to a resource provider from supervisor container-based cluster to create at least one resource associated with the at least one service-related software object to support the requested service for the guest container-based cluster.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for providing a service for a guest container-based cluster in a computing system, the method comprising:
   receiving a request for the service at the guest container-based cluster;
   in response to the request, creating a service software object corresponding to the service in the guest container-based cluster;
   in response to the service software object being created in the guest container-based cluster, creating a translated service software object in a supervisor container-based cluster of the computing system;

in response to the translated service software object being created in the supervisor container-based cluster, creating at least one service-related software object in the supervisor container-based cluster that corresponds to the translated service software object; and in response to the at least one service-related software object being created in the supervisor container-based cluster, sending provider-specific instructions to a resource provider from the supervisor container-based cluster to create at least one resource associated with the at least one service-related software object to support the requested service for the guest container-based cluster.

2. The method of claim 1, wherein the service of the request is a load balancer service for the guest container-based cluster.

3. The method of claim 1, wherein creating the service software object corresponding to the service in the guest container-based cluster includes creating a REpresentational State Transfer (REST) object in the guest container-based cluster.

4. The method of claim 1, wherein creating the translated service software object in the supervisor container-based cluster includes creating a service object with endpoints that are guest internet protocol addresses or port numbers in the supervisor container-based cluster.

5. The method of claim 4, wherein the at least one service-related software object that corresponds to the translated service software object includes a load balancer object, a load balancer type service object and one or more endpoints.

6. The method of claim 1, further comprising mapping the at least one service-related software object to the at least one resource to send the provider-specific instructions to the resource provider to create the at least one resource.

7. The method of claim 1, wherein the guest and supervisor container-based clusters are Kubernetes clusters.

8. The method of claim 1, wherein containers of the guest and supervisor container-based clusters are running on virtual machines in a cluster of host computers.

9. A non-transitory computer-readable storage medium containing program instructions for providing a service for a guest container-based cluster in a computing system, wherein execution of the program instructions by one or more processors of a computer system causes the one or more processors to perform steps comprising:

receiving a request for the service at the guest container-based cluster;

in response to the request, creating a service software object corresponding to the service in the guest container-based cluster;

in response to the service software object being created in the guest container-based cluster, creating a translated service software object in a supervisor container-based cluster of the computing system;

in response to the translated service software object being created in the supervisor container-based cluster, creating at least one service-related software object in the supervisor container-based cluster that corresponds to the translated service software object; and in response to the at least one service-related software object being created in the supervisor container-based cluster, sending provider-specific instructions to a resource provider from the supervisor container-based cluster to create at least one resource associated with the at least one service-related software object to support the requested service for the guest container-based cluster.

10. The non-transitory computer-readable storage medium of claim 9, wherein the service of the request is a load balancer service for the guest container-based cluster.

11. The non-transitory computer-readable storage medium of claim 9, wherein creating the service software object corresponding to the service in the guest container-based cluster includes creating a REpresentational State Transfer (REST) object in the guest container-based cluster.

12. The non-transitory computer-readable storage medium of claim 9, wherein creating the translated service software object in the supervisor container-based cluster includes creating a service object with endpoints that are guest internet protocol addresses or port numbers in the supervisor container-based cluster.

13. The non-transitory computer-readable storage medium of claim 12, wherein the at least one service-related software object that corresponds to the translated service software object includes a load balancer object, a load balancer type service object and one or more endpoints.

14. The non-transitory computer-readable storage medium of claim 9, wherein the steps further comprise mapping the at least one service-related software object to the at least one resource to send the provider-specific instructions to the resource provider to create the at least one resource.

15. The non-transitory computer-readable storage medium of claim 9, wherein the guest and supervisor container-based clusters are Kubernetes clusters.

16. The non-transitory computer-readable storage medium of claim 9, wherein containers of the guest and supervisor container-based clusters are running on virtual machines in a cluster of host computers.

17. A computing system comprising:
memory; and
at least one processor configured to:
receive a request for a service at a guest container-based cluster of the computing system;
in response to the request, create a service software object corresponding to the service in the guest container-based cluster;
in response to the service software object being created in the guest container-based cluster, create a translated service software object a supervisor container-based cluster of the computing system;
in response to the translated service software object being created in the supervisor container-based cluster, create at least one service-related software object in the supervisor container-based cluster that corresponds to the translated service software object; and
in response to the at least one service-related software object being created in the supervisor container-based cluster, send provider-specific instructions to a resource provider from the supervisor container-based cluster to create at least one resource associated with the at least one service-related software object to support the requested service for the guest container-based cluster.

18. The system of claim 17, wherein the translated service software object created in the supervisor container-based cluster is a service object with endpoints that are guest internet protocol addresses or port numbers in the supervisor container-based cluster.

19. The system of claim 18, wherein the at least one service-related software object that corresponds to the translated service software object includes a load balancer object, a load balancer type service object and one or more endpoints.

20. The system of claim 17, wherein the at least one processor is further configured to map the at least one service-related software object to the at least one resource to send the provider-specific instructions to the resource provider to create the at least one resource.

* * * * *